United States Patent
Clabau et al.

(10) Patent No.: US 10,075,683 B2
(45) Date of Patent: Sep. 11, 2018

(54) GLASS PANEL FOR DISPLAY SYSTEM

(71) Applicant: SEKISUI CHEMICAL CO., LTD., Osaka-city, Osaka (JP)

(72) Inventors: Frédéric Clabau, Paris (FR); Michael Labrot, Aachen (DE); Marc Lemaire, Villeurbanne (FR); Marie-Christine Duclos, Villeurbanne (FR); Estelle Metay, Vaulx en Velin (FR)

(73) Assignee: SEKISUI CHEMICAL CO., LTD., Osaka (JP)

( * ) Notice: Subject to any disclaimer, the term of this patent is extended or adjusted under 35 U.S.C. 154(b) by 310 days.

(21) Appl. No.: 15/031,144

(22) PCT Filed: Oct. 15, 2014

(86) PCT No.: PCT/FR2014/052626
§ 371 (c)(1),
(2) Date: Apr. 21, 2016

(87) PCT Pub. No.: WO2015/059386
PCT Pub. Date: Apr. 30, 2015

(65) Prior Publication Data
US 2016/0269696 A1   Sep. 15, 2016

(30) Foreign Application Priority Data
Oct. 22, 2013   (FR) ...................... 13 60289

(51) Int. Cl.
*H04N 9/31* (2006.01)
*B32B 17/10* (2006.01)
(Continued)

(52) U.S. Cl.
CPC ..... *H04N 9/3141* (2013.01); *B32B 17/10036* (2013.01); *B32B 17/10669* (2013.01);
(Continued)

(58) Field of Classification Search
None
See application file for complete search history.

(56) References Cited

U.S. PATENT DOCUMENTS 5,013,134 A   5/1991   Smith
6,979,499 B2   12/2005   Walck et al.
(Continued)

FOREIGN PATENT DOCUMENTS

CN   102458835 A   5/2012
EP   0 893 340 A1   1/1999
(Continued)

OTHER PUBLICATIONS

The First Office Action for the Application No. 201480058167.1 from the State Intellectual Property Office of the Peoples Republic of China dated Mar. 1, 2017.
(Continued)

*Primary Examiner* — Gregory D Clark
(74) *Attorney, Agent, or Firm* — Cheng Law Group, PLLC

(57) ABSTRACT

A glazing for information display includes an assembly of at least two transparent sheets of inorganic glass or of a plastic, connected together by a thermoplastic or adhesive interlayer or by multilayer sheets incorporating such an interlayer, at least one luminophore material being incorporated into the glazing to enable the display, wherein one of the luminophores includes a benzene ring substituted at least by: two hydroxyl OH groups, a carbon-based R group, the R group including an unsaturated heterocycle, a carbon-based R' group of formula —COOR", wherein R" is a hydrocarbon-based group or hydrogen.

19 Claims, 1 Drawing Sheet

(51) Int. Cl.
- B32B 27/30 (2006.01)
- B32B 27/36 (2006.01)
- G02B 27/01 (2006.01)
- F21V 9/30 (2018.01)
- F21W 131/405 (2006.01)

(52) U.S. Cl.
CPC ...... *B32B 17/10761* (2013.01); *B32B 27/308* (2013.01); *B32B 27/365* (2013.01); *F21V 9/30* (2018.02); *G02B 27/0101* (2013.01); *B32B 2307/422* (2013.01); *B32B 2457/20* (2013.01); *B32B 2605/006* (2013.01); *F21W 2131/405* (2013.01)

(56) References Cited

U.S. PATENT DOCUMENTS

| | | |
|---|---|---|
| 2004/0070551 A1 | 4/2004 | Walck et al. |
| 2004/0232826 A1 | 11/2004 | Liu et al. |
| 2005/0184655 A1 | 8/2005 | Kitamura |
| 2005/0231652 A1 | 10/2005 | Liu et al. |
| 2012/0068083 A1* | 3/2012 | Labrot ............... B32B 17/10 |
| | | 250/461.1 |
| 2014/0355106 A1 | 12/2014 | Laluet et al. |

FOREIGN PATENT DOCUMENTS

| | | |
|---|---|---|
| FR | 2 929 017 A1 | 9/2009 |
| WO | WO 2007/003849 A2 | 1/2007 |
| WO | WO 2009/122094 A1 | 10/2009 |
| WO | WO 2010/139889 A1 | 12/2010 |
| WO | WO 2013/093351 A1 | 6/2013 |

OTHER PUBLICATIONS

International Search Report as issued in International Patent Application No. PCT/FR2014/052626, dated Feb. 6, 2015.

* cited by examiner

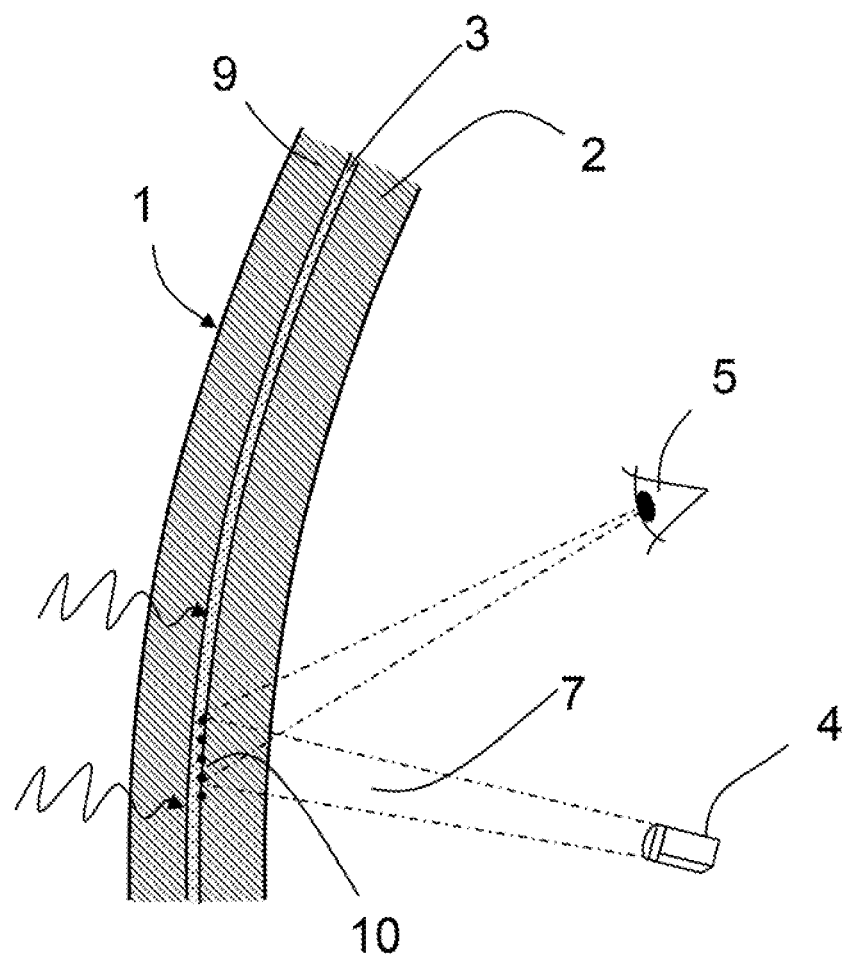

GLASS PANEL FOR DISPLAY SYSTEM

CROSS-REFERENCE TO RELATED APPLICATIONS

This application is the U.S. National Stage of PCT/FR2014/052626, filed Oct. 15, 2014, which in turn claims priority to French Application No. 1360289, filed Oct. 22, 2013. The contents of all of these applications are incorporated herein by reference in their entirety.

The present invention relates to the field of display systems using transparent supports made of inorganic glass or made of rigid plastic, in particular motor vehicle windshields or glazing for buildings, in particular store windows.

Most particularly, even though it is not limited thereto, the present invention relates to the field of display systems referred to in the art as head-up display (HUD) systems. Such systems are of use in particular in aircraft cockpits, trains but also nowadays in private motor vehicles (cars, trucks, etc.). These systems make it possible in particular to inform the driver of the vehicle without him looking away from the field of view ahead of the vehicle, thereby greatly increasing safety.

In such systems, the glazing generally consists of a sandwich structure, most simply comprising two sheets of rigid material such as sheets of glass. The sheets of rigid material are connected together by a thermoplastic interlayer sheet usually comprising or consisting of polyvinyl butyral (PVB). Without departing from the scope of the invention, in particular in the field of aviation or of safety glazing having ballistic-resistant properties, the glazing may also be formed from transparent rigid plastic sheets, for example made of polycarbonate or of PMMA, or from an assembly of a glass sheet and one such rigid plastic sheet. Equally, the glazing according to the invention may comprise a sheet of glass or of transparent rigid plastic, in particular of the aforementioned type, and a sheet of flexible plastic bonded to said rigid sheet. The term "rigid" is understood to mean that the mechanical characteristics of the substrate are suitable for use of the support as building glazing, windshield, etc.

Most conventionally, the display of information in the car is obtained by projecting an image onto a windshield having a laminated structure, that is to say formed from two sheets of glass and a thermoplastic interlayer. However, the driver then sees a double image: a first image reflected by the surface of the windshield facing the interior of the passenger compartment and a second image by reflection off the exterior surface of the windshield, these two images being slightly offset with respect to one another. This offset may cause the information seen to be disturbed. In order to overcome this problem, mention may be made of the solution proposed in patent U.S. Pat. No. 5,013,134, in which a head-up display system is described that uses a laminated windshield formed from two sheets of glass and a polyvinyl butyral (PVB) interlayer, the two outer faces of which are not parallel but wedge-shaped, so that the image projected by a display source and reflected by the side of the windshield facing the passenger compartment are practically superimposed on the same image originating from the same source reflected by the side of the windshield facing the outside. In order to eliminate the double image, wedge-shaped laminated glazing is conventionally produced by using an interlayer sheet having a thickness that decreases from the top edge of the glazing to the bottom edge. However, it is necessary for the PVB profile to be very regular and not to have thickness variations, as these are transmitted during assembly to the windshield and lead to local angle variations.

Alternatively, it is proposed in patent U.S. Pat. No. 6,979,499 B2 to send an incident beam, of appropriate wavelength, to luminophores directly incorporated into the glazing, which are capable of responding to the excitation by emitting light radiation in the visible light range. In this way, a real, and no longer virtual, image is formed directly on the windshield. This image is also visible by all the passengers of the vehicle. Patent U.S. Pat. No. 6,979,499 B2 describes in particular laminated glazing with an interlayer sheet of polyvinyl butyral (PVB) type, the two outer faces of which are parallel and in which an additional layer of luminophores is incorporated. The luminophores are selected as a function of the wavelength of the incident excitation radiation. This wavelength usually lies in the UV-visible range, in particular between 350 and 410 nm, more rarely in the IR range. The luminophores, under this incident radiation, re-emit radiation in the visible range. It is referred to as down-conversion when the incident radiation is UV radiation and as up-conversion when the incident radiation is IR radiation. According to this document, such a construction makes it possible to reproduce an image of any object directly on the windshield or glazing. According to this disclosure, luminophore materials are deposited over at least one portion of the surface of one of the sheets constituting the laminated glazing (PVB or glass), in the form of a continuous layer optionally comprising several types of luminophores. The desired image is obtained by selective excitation of a given area of the luminophore layer. The location of the image and its shape are obtained by means of an excitation source controlled and modulated by external means.

Experiments carried out by the applicant have shown that such HUD devices, incorporating luminophores into the assembled glazing, are characterized by too weak a luminance under a conventionally unfocused UV excitation source. Yet, the concentration of the luminophores is limited by the haze value and by the color of the windshield, which must not be too pronounced so as not to obstruct the driver's vision.

In particular, it appears that the luminous intensity obtained with such devices still remains highly insufficient when the external luminosity is high, and generally in daytime vision, since it does not exceed a few tens of candelas. Typically, it has been measured on a conventional "HUD" system, i.e. that operates according to the principles of reflection, that monochromatic radiation was visible by an observer, for example in the viewing area of the driver of a vehicle, if the luminance was of the order of several hundreds of $cd/m^2$, in particular notably greater than 500 $cd/m^2$, or even 1000 $cd/m^2$, under normal daytime external lighting conditions of the windshield.

In order to obtain such a luminance, it is possible to use excitation sources that generate concentrated and directed light, delivered by more specific sources of diode type.

Another crucial problem linked to the use of concentrated light sources such as diodes (optionally laser diodes) stems from the choice of the luminophore used: this must have a high incident radiation conversion efficiency but must not degrade under external UV radiation nor under the incident excitation radiation when this is of laser type, in order to ensure a suitable lifetime of the display function.

In such glazing that enables information to be displayed directly on its surface, the choice of the luminophore thus appears crucial and is inevitably a compromise between various characteristics and properties linked to such a use, among which the most important are:
- a high luminance provided by a good quantum efficiency under the incident excitation radiation,
- a maximum durability with respect to the incident solar UV radiation, in particular as measured by the Arizona-WOM® test in the field,
- a transparency such that the haze is not greater than 2% and the light transmission is greater than 70%, as measured according to the ISO 9050 (2003) standard,
- a chemical compatibility with the thermoplastic sheet forming the glazing,
- a relatively neutral color, in particular when it is present in a high concentration in the glazing, such as for example measured by the "Yellowness Index" test according to the DIN 6167 standard,
- a satisfactory durability with respect to the incident excitation radiation.

In order to solve all of the problems disclosed above, patent application WO 2010/139889 already describes the use of a luminophore material of hydroxy-terephthalate type, having a high luminance, provided by a good quantum efficiency under incident UV excitation and a good durability in aging tests under UV excitation.

While the compounds described in this patent application have very good general properties, their luminescence is still centered about an emission wavelength close to 440 nm, i.e. an emission of blue color.

Within the context of the display of information on a windshield or on a store window, it however proves necessary to obtain new compounds, the emission wavelength of which is this time centered about other colors of the visible spectrum, in particular close to orange, in order to allow a polychromatic display of the information projected onto the windshield.

Of course, it is necessary to maintain or at least not to unacceptably degrade all the other properties as described above, in particular the quantum efficiency under incident UV excitation, the durability in aging tests under UV excitation, and the color under ambient lighting.

However, since the Stokes shift (difference between the maxima of the excitation and emission spectra) is customarily low for organic compounds, an emission of orange color (i.e. with an emission maximum beyond 550 nm) should normally involve a very pronounced absorption in the visible range (typically that may extend up to at least 500 nm). Such an absorption of a portion of the light spectrum results in a very pronounced orange color of the luminophore, highly prejudicial to use in glazing used for the display of information.

The objective of the present invention is thus to propose glazing incorporating luminophores, the emission maximum of which is centered about a wavelength between 550 and 650 nm, giving a yellow-orange-red emission color, but weakly absorbing the visible light, in particular the radiation between 440 and 550 nm, such that the color of the glazing appears relatively neutral, even under strong insolation.

The present invention relates to glazing comprising luminophore compounds that therefore have a luminescence centered about a wavelength much higher than that of the compounds described in patent application WO 2010/139889, it being possible for the two in particular to be combined in a glazing in order to ensure the polychromy of the image viewed thereon.

More specifically, the present invention relates to a glazing for information display, in particular to a motor vehicle windshield or glazing for a building, comprising an assembly of at least two transparent sheets of inorganic glass or of a rigid plastic, connected together by a thermoplastic or adhesive interlayer or by multilayer sheets incorporating such an interlayer, at least one luminophore material being incorporated into said glazing to enable said display. According to the invention, one of said luminophores comprises a benzene ring substituted at least by:
- two hydroxyl OH groups,
- a carbon-based R group, said R group comprising a preferably unsaturated, in particular aromatic heterocycle,
- a carbon-based R' group of formula —COOR", wherein R" is a hydrocarbon-based group or hydrogen.

According to the invention, at least one of said luminophores is incorporated into said interlayer or else positioned between this interlayer and one of the transparent sheets or else incorporated into an optional plastic transparent sheet.

Preferably, the luminophore is incorporated into the interlayer, in particular when the latter is made of PVB.

According to certain advantageous but nonlimiting embodiments of the present invention, which may where appropriate be combined together:
- the electrons of the unsaturated ring enter into resonance with the electrons of the benzene ring;
- the luminophore material comprises two hydroxyl groups in para position with respect to one another and two R and R' groups in para position with respect to one another;
- said unsaturated heterocycle comprises at least one nitrogen atom;
- R' is a —COOR" ester group, wherein R" is a hydrocarbon-based chain comprising from 1 to 15 carbon atoms, limits included;
- R" is a hydrocarbon-based chain comprising a main carbon-based chain comprising more than 5 successively bonded carbon atoms;
- R" is a linear or branched carbon-based group comprising a main carbon-based chain comprising more than 5 consecutive carbon atoms, said R" group comprising, if said chain is linear, more than 10 carbon atoms in total and, if said chain is branched, at least 7 carbon atoms in total;
- the R group comprises an unsaturated heterocycle and a benzene ring;
- said R group comprises an oxazole group and preferably comprises or consists of a benzoxazole group:

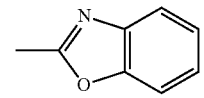

- said R group comprises an imidazole group and preferably comprises or consists of a benzimidazole group:

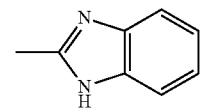

- the interlayer is made of thermoplastic and said luminophore is dispersed in said thermoplastic;
- the thermoplastic constituting said interlayer is selected from the group of PVBs, plasticized PVCs, polyurethane PU or ethylene/vinyl acetates EVAs;

said glazing is a motor vehicle or aircraft windshield comprising an assembly of two transparent sheets, consisting of inorganic glass or of plastic such as PMMA or polycarbonate, connected together by a thermoplastic or adhesive interlayer;

said glazing is glazing for a building, in particular a store window, a spandrel glass or a dividing wall or partition.

According to a first aspect, the glazing according to the invention is a windshield for a motor vehicle. Such laminated glazing then customarily consists of an assembly of two rigid sheets of inorganic glass connected by an interlayer made of a thermoplastic. For example, the thermoplastic forming said interlayer is selected from the group of PVBs, plasticized PVCs, polyurethane PU or ethylene/vinyl acetates EVAs.

Preferably, the thermoplastic is PVB.

According to one possible embodiment, the transparent sheets are connected together by a multilayer sheet incorporating a succession of PVB/PET/PVB layers, in which PET is polyethylene terephthalate.

Laminated glazing according to the invention may in particular be obtained by a process in which the thin layer of luminophores is deposited on one of the glass panes of the glazing or on the interlayer such as the PVB-type thermoplastic sheet by a technique selected from screenprinting, spraying, roller, coating or inkjet techniques or else techniques of the offset, flexographic or photogravure type, in the form of a solution containing a solvent and optionally a polymer binder, and then the glazing is laminated in an autoclave. The luminophores may also be introduced during the production, via extrusion, of the thermoplastic sheet, generally directly in powder form.

Typically, in such a windshield according to the invention, after this lamination step, the luminophore according to the invention is dispersed in said thermoplastic.

According to another aspect, the glazing according to the invention is an aviation windshield as described for example in the publications EP 0 893 340 B1 or WO 2007/003849.

According to a third aspect, the glazing according to the invention is glazing for a building, in particular a store window, a spandrel glass or a dividing wall or partition enabling the display of information by means of the latter.

Without departing from the scope of the invention, and according to a fourth aspect, the glazing may also consist of a sheet of glass, bonded to which, by means of an interlayer of an adhesive material, for example an acrylic adhesive, is a sheet of flexible plastic, for example made of polyester.

The invention lastly relates to a device for displaying an image on transparent glazing, comprising glazing as claimed in one of the preceding embodiments and a source generating concentrated excitation radiation of diode, optionally laser diode, type, the radiation of which is between 350 and 410 nm, the excitation radiation being directed toward the area(s) of the glazing comprising the luminophore layer.

In the display device, the source generating UV-visible radiation typically comprises at least one laser diode emitting UV-visible excitation radiation, the wavelength of which is less than 410 nm and preferably is of the order of 405 nm.

Preferably, the display device also comprises means for modulating the power of the source generating UV-visible radiation, in particular in order to adapt the luminance to the external lighting conditions of the glazing, for example as a function of the insolation conditions of the glazing.

For example, the modulation means may define at least one power suitable for daytime use and at least one power lower than the preceding one that is suitable for nighttime use.

BRIEF DESCRIPTION OF THE DRAWING

The FIGURE is a schematic illustration of a windshield and a device positioned in a passenger compartment of a motor vehicle (not shown).

DETAILED DESCRIPTION OF THE INVENTION

The invention and its advantages will be better understood on reading the following embodiment of the invention, in connection with the single appended FIGURE.

The appended FIGURE makes it possible to illustrate the invention and its advantages.

In this FIGURE, a windshield and a device according to the invention are schematically represented:

The windshield 1 is composed of two sheets 2 and 9 typically made of glass but which could also consist of rigid and strong plastic supports or sheets, for example made of polycarbonate. Present between the two sheets is a thermoplastic interlayer sheet 3 such as PVB (polyvinyl butyral), plasticized PVC, PU or EVA or else a multilayer thermoplastic sheet incorporating for example PET (polyethylene terephthalate), the succession of the layers in which is for example PVB/PET/PVB.

Particles of organic luminophore according to the invention are inserted into the interlayer thermoplastic sheet 3 before the assembly of the various sheets, either directly during the extrusion of the thermoplastic sheet, or by virtue of a deposition by one of the techniques mentioned below. The deposition is carried out over at least one portion of the inner face of the inner sheet of the glazing or over at least one portion of the inner face of the thermoplastic sheet.

Preferably, the luminophore particles before lamination have a size distribution predominantly between 1 and 100 microns. The term "predominantly" is understood to mean that more than 90% of the particles making up the commercial powder have a diameter of between 1 and 100 microns.

A source 4 that emits excitation light radiation is used to send incident concentrated radiation 7 having a wavelength close to 400 nm. The luminophore 10, present in molecular form in the interlayer thermoplastic sheet 3 after lamination, has a high absorption coefficient for the incident radiation. It therefore reemits intense radiation in the visible range.

The visible radiation emitted by the luminophore is then directly observable by the eye 5 of the driver, who thus sees the object on the windshield without having to avert his eyes from the road. In this way, an image can be directly formed on a laminated windshield without it being necessary to adapt the structure of the latter, for example the thickness of the interlayer sheet, thereby enabling economical production of HUD systems.

The source used for generating the concentrated radiation is for example a UV-visible source of diode, optionally laser diode, type.

According to one possible embodiment, it is possible to use a DLP projector in order to modulate the excitation wave according to the method described in patent application US 2005/231652, paragraph [0021]. It is also possible according to the invention to use, as UV-visible excitation source, a device as described in patent application US 2004/0232826, in particular as described in connection with FIG. 3.

As indicated above, the luminophore may be inserted into the PVB sheet during the extrusion of the latter, or else it may be deposited on the glass or the PVB sheet for example by screenprinting, spraying, roller, coating or inkjet techniques or else by techniques of the offset, flexographic or photogravure type.

Preferably, the deposition by one of the preceding techniques is carried out after dissolving or dispersing the luminophore particles in a solvent that evaporates rapidly, and which may also contain, in dissolved form, material constituting the thermoplastic sheet, for example PVB, in order to facilitate the incorporation of the luminophore into the thermoplastic sheet when the latter is itself made of PVB.

It has been found by the applicant that, within the context of an application for displaying an image by means of transparent glazing, the use of luminophores according to the invention makes it possible to effectively meet the following requirements, necessary for such an application:
a) an acceptable sharpness of the image,
b) a luminescence intensity sufficient for it to be observable by the driver,
c) a light transmission greater than 70%.

The preceding embodiment obviously in no way limits the present invention, in any of the aspects described above.

EXAMPLES

The following examples make it possible to illustrate an exemplary embodiment of a laminated windshield according to the present invention and the advantages thereof with respect to the prior art.

In the examples, various comparative laminated glazings and laminated glazings according to the present invention are synthesized. All the glazings comprise the succession of two sheets of glass connected by a PVB interlayer sheet having a thickness of 760 microns. The assembly is carried out according to the well-known techniques of the art.

Prior to the lamination, a layer of luminophores, the structural formula of which is given below, is deposited as a square with dimensions of approximately 10×10 cm$^2$ by a conventional spraying technique onto the inner glass sheet 2 and onto its side facing the PVB sheet, before the assembly step (see FIGURE).

More specifically, the luminophore is diluted beforehand in a solvent of ethanol or tetrahydrofuran (THF) type. The dilution is carried out close to the maximum solubility of the luminophore in the solvent in order to minimize the volume of solution.

The mixture is then deposited by spraying according to conventional techniques on the glass sheet, so as to obtain, after drying of the solvent, a weight of solids of the order of 5 g per m$^2$ of glass.

Next, the solvent is left to evaporate and then the lamination is carried out with the two glass sheets and the PVB sheet according to autoclave techniques conventional in the field. A windshield as illustrated in the FIGURE is thus obtained.

The parameters described above were measured on the various glazings obtained, according to the following protocols:

The heat resistance of the glazing was carried out in accordance with the test described in the European standard ECE R43 A3/5.

The absolute luminescence intensities were measured by a UV-visible spectrometer and compared to one another by dividing the maximum luminescence intensity by the molecular concentration of luminophores, for all of the molecules tested. A reference intensity 100 is attributed to the reference compound according to example 1.

The emissions that lie in wavelength ranges in which the sensitivity of the human eye varies greatly with the wavelength (in particular with a greater sensitivity in the green-yellow range). The relative luminances, taking into account the luminous efficacy of the human eye as a function of the emission wavelength, are also calculated on the basis of the preceding data, for all of the modules tested, for one and the same molecular concentration.

The durability to incident solar UV radiation was measured by the WOM Arizona® test which consists in exposing the glazing to radiation emitted by a xenon arc lamp in order to simulate solar radiation according to the ISO 4892 (part 2) standard at a temperature of 90° C. Such exposure enables accelerated aging of the luminophore by a factor of approximately 10. The measurement of the luminance after 3000 hours exposure (therefore corresponding substantially to 3 years of use under actual conditions), relative to the initial luminance, makes it possible to estimate and to compare, directly and simply, the durability properties of the various luminophores under UV radiation.

The durability under excitation radiation was measured according to the following method:

A power diode having an emission wavelength equal to 405 nm was directed directly onto the portion of the glazing comprising the luminophore layer, over a surface area of around 1 mm$^2$. A luminance meter is directed at the light spot emitted and the luminance in cd/m$^2$ is measured continuously.

Measured next, after 500 h, is the relative luminance of the irradiated part, on the basis of the initial luminance, this value characterizing, according to the invention, the durability of the luminophore under the incident concentrated radiation. The continuous illumination by a fixed spot of great power may lead to a rapid degradation of the luminophore and therefore to a rapid reduction in its luminance. A relative luminance of 1 indicates in particular that the luminophore is perfectly stable under the incident UV radiation.

The values measured for these various parameters are reported in table 1 below.

The various molecules tested correspond to the formulations described hereinafter.

The comparative compound according to example 1 is the commercial product diethyl 2,5-dihydroxyterephthalate identified under the CAS number 5870-38-2. It has been described in patent application WO 2010/139889.

The other molecules are obtained by virtue of the following methods of synthesis:

For the molecule according to example 2: diethyl 2,5-dihydroxyterephthalate and potassium hydroxide are refluxed in ethanol. The product obtained is treated in the presence of $SOCl_2$, then is reacted with aminophenol in the presence of methanesulfonic acid in order to obtain the compound described below. The structure of the compound was verified by customary techniques in the field (NMR, mass spectroscopy, etc.).

For the molecule according to example 3: 2,5-dihydroxyterephthalic acid is condensed with aminophenol in the presence of polyphosphoric acid. The product obtained undergoes an esterification reaction with 1-dodecanol in the presence of PTSA (para-toluenesulfonic acid) in toluene, in order to obtain the compound described below.

For the molecule according to example 4: a mixture of diethyl 2,5-dihydroxyterephthalate and potassium hydroxide are refluxed in ethanol. The product obtained is treated in the presence of $SOCl_2$, then is reacted with diaminobenzene in the presence of methanesulfonic acid in order to obtain the compound according to the example 4 described below.

The molecules synthesized are:

Example 1 (according to WO 2010/139889):

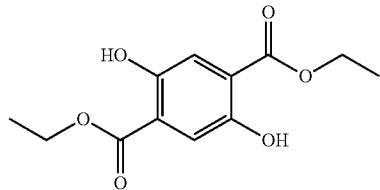 [SMILES: CCOC(=O)c1cc(O)c(C(=O)OCC)cc1O]

Example 2 (according to the invention):

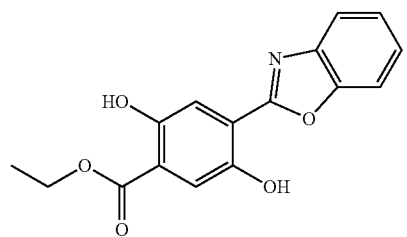 [SMILES: CCOC(=O)c1cc(O)c(-c2nc3ccccc3o2)cc1O]

Example 3 (according to the invention):

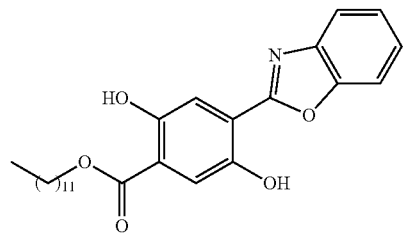

Example 4 (according to the invention):

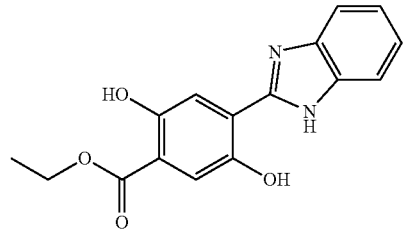 [SMILES: CCOC(=O)c1cc(O)c(-c2nc3ccccc3[nH]2)cc1O]

All of the results obtained are collated in table 1:

TABLE 1

|  | Example 1 (reference) | Example 2 (invention) | Example 3 (invention) | Example 4 (invention) |
| --- | --- | --- | --- | --- |
| Color of the luminophore | Very weak yellow color | Light yellow color | Light yellow color | Very weak yellow color |
| Heat resistance (ECE R43 A3/5) | In accordance | In accordance | In accordance | In accordance |
| Light transmission | >70% | >70% | >70% | >70% |
| Durability under UV radiation (as % of the initial luminance after 3000 h) | 100 | 100 | 100 | 75 |
| λ (nm) corresponding to the emission maximum under UV excitation | 450 nm | 595 nm | 595 nm | 575 nm |
| Perceived color | Blue | Orange | Orange | Orangey yellow |
| Absolute (molar) luminescence intensity at emission $\lambda_{max}$ ($\lambda_{exc}$ = 405 nm) | 100 | 20 | 35 | 35 |
| Molar relative luminance under UV excitation | 100 | 55 | 90 | 160 |

The results reported in table 1, in comparison with the reference luminophore according to example 1, show that the properties of durability under UV radiation (Arizona) are satisfactory for all the compounds tested. Furthermore, all are in accordance with the heat resistance tests.

The emission color of the sample according to example 4 appears to be orangey yellow, with an emission maximum centered about 575 nm, while the emission color of the samples according to examples 2 and 3 is orange, with an emission maximum centered about 595 nm. The maximum (absolute) luminescence intensity of the three compounds appears to be lower than that of the reference compound, although still high, in particular with regard to the very high Stokes shift between the absorption bands and the emission bands of the compounds according to the invention. This lower performance with respect to the reference compound is however compensated for by the greater sensitivity of the eye for yellow and orange colors. Thus, the relative luminance (i.e. taking into account the sensitivity of the eye) of the three compounds under UV excitation approaches the luminance of the reference compound, or even exceeds it.

Moreover, surprisingly, it is observed that the luminance of the luminophore according to example 2 may be increased further with the lengthening of the carbon-based chain present in the ester group positioned on the benzene ring. In the end, the luminophores according to the invention appear perfectly compatible with the reference compound for allowing the display of color images on glazing according to the invention.

In the foregoing description, the present invention has been described in connection with the use of glazing under laser excitation. It is very obvious that the present invention is not limited to this excitation method and that other sources of radiation, in particular power light-emitting diodes, may be used as source of excitation radiation, for example for displaying pictograms preprinted on said glazing, as described in patent application WO 2009/122094 or FR2929017.

Also, the invention relates to any glazing comprising a luminophore according to the invention, optionally as a mixture with other luminophores emitting in other colors of the visible spectrum, in particular for obtaining a polychromatic image.

The invention claimed is:

1. A glazing for information display comprising an assembly of at least two transparent sheets of inorganic glass or of a rigid plastic, connected together by a thermoplastic or adhesive interlayer or by multilayer sheets incorporating such an interlayer, at least one luminophore material being incorporated into said glazing to enable said display, wherein the at least one luminophore material comprises a benzene ring substituted at least by:
   two hydroxyl OH groups,
   a carbon-based R group, said R group comprising a heterocycle,
   a carbon-based R' group of formula —COOR", wherein R" is a hydrocarbon-based group or hydrogen.

2. The glazing as claimed in claim 1, wherein said heterocycle is unsaturated.

3. The glazing as claimed in claim 2, wherein said heterocycle is aromatic.

4. The glazing as claimed in claim 3, wherein the electrons of the unsaturated or aromatic ring enter into resonance with the electrons of the benzene ring.

5. The glazing as claimed in claim 1, wherein the two hydroxyl groups are in para position with respect to one another and wherein the R and R' groups are in para position with respect to one another.

6. The glazing as claimed in claim 1, wherein said heterocycle comprises at least one nitrogen atom.

7. The glazing as claimed in claim 1, wherein R' is a COOR" ester group, wherein R" is a hydrocarbon-based chain comprising from 1 to 15 carbon atoms, limits included.

8. The glazing as claimed in claim 1, wherein R" is a hydrocarbon-based chain comprising a main carbon-based chain comprising more than 5 successively bonded carbon atoms.

9. The glazing as claimed in claim 1, wherein R" is a linear or branched carbon-based group comprising a main carbon-based chain comprising more than 5 consecutive carbon atoms, said R" group comprising, if said chain is linear, more than 10 carbon atoms in total and, if said chain is branched, at least 7 carbon atoms in total.

10. The glazing as claimed in claim 1, wherein said R group comprises an unsaturated heterocycle and a benzene ring.

11. The glazing as claimed in claim 1, wherein said R group comprises a benzoxazole group:

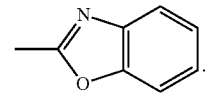

12. The glazing as claimed in claim 1, wherein said R group comprises a benzimidazole group:

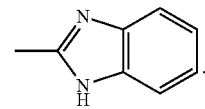

13. The glazing as claimed in claim 1, wherein the interlayer is made of thermoplastic and wherein said luminophore material is dispersed in said thermoplastic.

14. The glazing as claimed in claim 1, wherein the thermoplastic constituting said interlayer is selected from the group consisting of PVBs, plasticized PVCs, polyurethane PU and ethylene/vinyl acetates EVAs.

15. A motor vehicle or aviation windshield consisting of glazing as claimed in claim 1, comprising an assembly of two transparent sheets, consisting of inorganic glass or of plastic, connected together by a thermoplastic or adhesive interlayer.

16. A glazing for a building, in particular a store window, a spandrel glass or a dividing wall or partition, as claimed in claim 1.

17. A device for displaying an image on transparent glazing, comprising a glazing as claimed in claim 1 and a source configured to generate concentrated excitation radiation of diode type, the radiation of which is between 350 and 410 nm, the excitation radiation being directed toward an area of the glazing comprising the luminophore material.

18. The motor vehicle or aviation windshield as claimed in claim 15, wherein the plastic is PMMA or polycarbonate.

19. The device as claimed in claim 17, wherein the diode is a laser diode.

* * * * *